Jan. 31, 1950  R. MERCIER  2,495,815
MECHANICAL MOVEMENT

Filed April 14, 1947  3 Sheets-Sheet 1

INVENTOR:
Robert Mercier
By: Hazeltine Lake & Co
AGENTS.

Jan. 31, 1950  R. MERCIER  2,495,815
MECHANICAL MOVEMENT
Filed April 14, 1947  3 Sheets-Sheet 3

INVENTOR:
Robert Mercier
By: Haseltine Lake & Co
AGENTS.

Patented Jan. 31, 1950

2,495,815

UNITED STATES PATENT OFFICE 2,495,815

MECHANICAL MOVEMENT

Robert Mercier, Paris, France, assignor to Fondation dite: Groupement Francais pour le Developpement des Recherches Aeronautiques, Paris, France Application April 14, 1947, Serial No. 741,196
In France April 12, 1946

Section 1, Public Law 690, August 8, 1946
Patent expires April 12, 1966

1 Claim. (Cl. 74—51)

The present invention relates to a mechanical system for converting rectilinear reciprocatory movement into a circular movement or conversely, and more particularly to an improved system of connecting rods and links for use in rotary engines, pumps or the like.

It is a principal object of this invention to provide an improved form of crank journal, main rod and link assembly which may be used to convert a plurality of rectilinear reciprocating movements into a common rotary movement as in a rotary engine, and enable the symmetry of the system to be restored, together with means to introduce at the crank journal a supplemental adjustment of the symmetry of the system at the user's disposal.

Further objects and advantages of the invention will be apparent with reference to the following specification and drawings in which.

Usually, a rectilinear reciprocatory movement is converted into a circular movement or conversely with the aid of a so-called eccentric system, of which the rod-and-crank system is an example of a practical embodiment.

Figure 1:
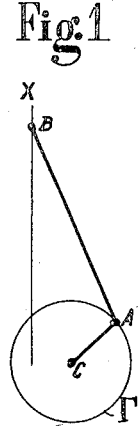
Figures 1 to 4 are explanatory diagrams.

Such a system is represented diagrammatically in Figure 1 wherein X designates the straight line on which the point B is reciprocated, Γ the circle centered at G on which the point A is displaced, and the lengths CA (crank radius) and AB (rod length) are constant.

Figure 2:
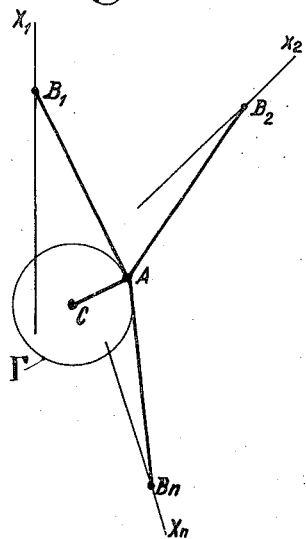
Figure 3:
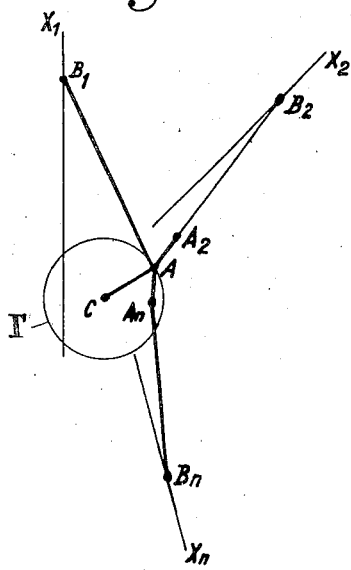

As shown in Figure 2, it is often necessary in the design of rotary engines or pumps, to have a plurality of rods $AB_1$, $AB_2$ ... $AB_n$ journaled at the same point A. However, the practical realization of this arrangement is often impossible and one is then led to design an arrangement which is slightly different and more elaborate such as the system comprising a main rod and links as illustrated diagrammatically in Figure 3 wherein the points $A_2$, ... $A_n$ are rigidly connected with the rod $AB_1$, which is then called the main rod, and the links $A_2B_2$, ... $A_nB_n$ are journaled at the points $A_2$, ... $A_n$ of the main rod. The latter thus performs a double function in that it is a particular rod providing for constancy of the length $AB_1$ and on the other hand it is used as a connection to determine the paths of the points $A_2$, ... $A_n$ as the point A moves on the circle Γ.

Consequently, in such form of crank journal, main rod and link assembly, a dissymmetry which may prove objectionable exists in the action of the various rods, in addition to which the points A, $A_1$, $A_2$, ... $A_n$ do not follow the same path.

Figure 4:
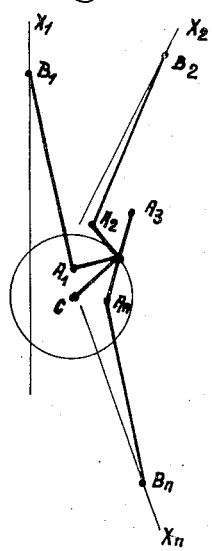

The present invention is aimed at an arrangement whereby the symmetry of the system is restored and which includes in addition in the rod-assembly, a supplemental possibility of adjustment which may be fixed at the user's wish. The principle of this arrangement is known and includes the use of a member turning about A and to which the points $A_1$, $A_2$, ... $A_n$ are rigidly connected. Said points $A_1$, $A_2$, ... $A_n$, at which the various rods are fulcrumed, are distributed symmetrically about A as shown in Figure 4. Moreover, an auxiliary device which is a feature of the invention to be described enables the value of the parameter defining the position of the rotatable part to be determined at all times with respect to point A as far as the movement to be imparted to said part is consistent with its connections.

The above principle aims in particular at an arrangement of engine rods comprising several cylinders and pistons placed radially in which a crank-shaft transmitting the movement of the engine bears a ring mounted rotatively on the crank-shaft, this ring being hinged in points distributed on its periphery at the ends of the rods which drive the pistons of the cylinders and being actuated about the crank-shaft with a relative rotary movement such that its movement resulting from the system during the rotation of the crank-shaft shall be a movement of transmission.

In the known devices the rotary movement of the ring on the crank-shaft, operated by the rotation of the shaft itself is transmitted by gear combinations. The object of the present invention is a device of the type whereby the transmission is carried out by a hydraulic system without any gear.

Figure 5:
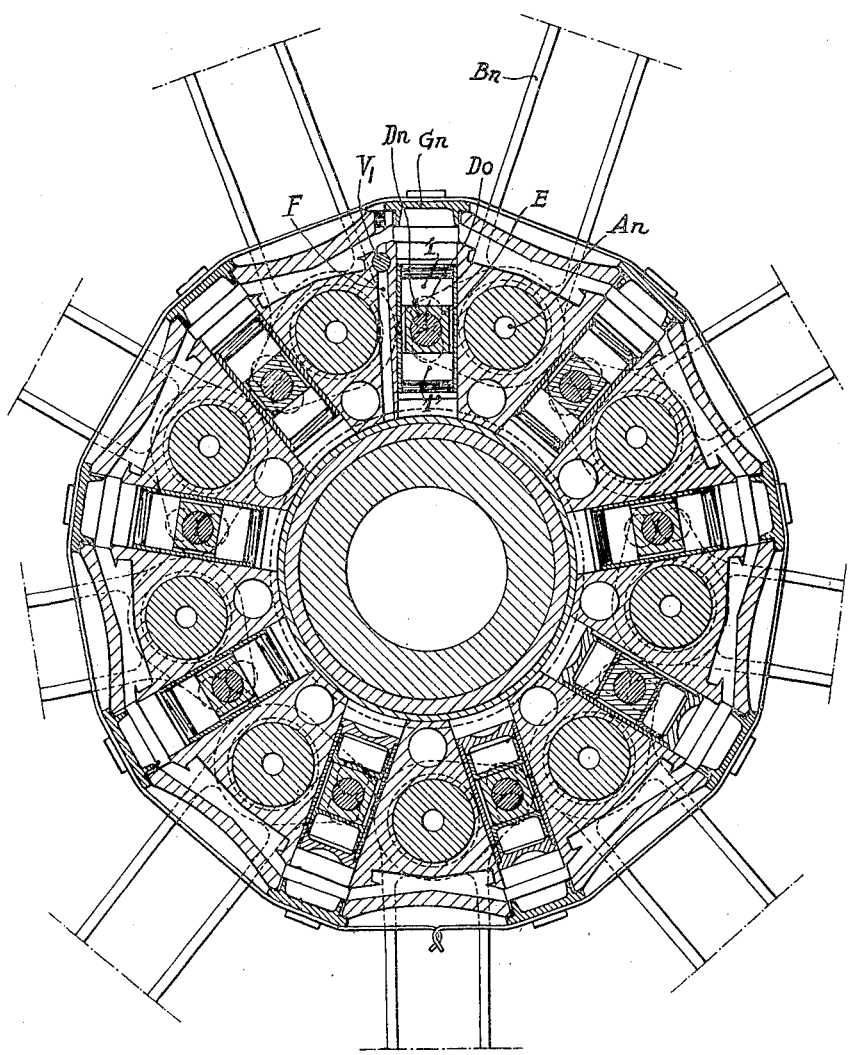
Figures 5 and 6 are sections of the form of embodiment illustrated by the invention.
Figure 6:
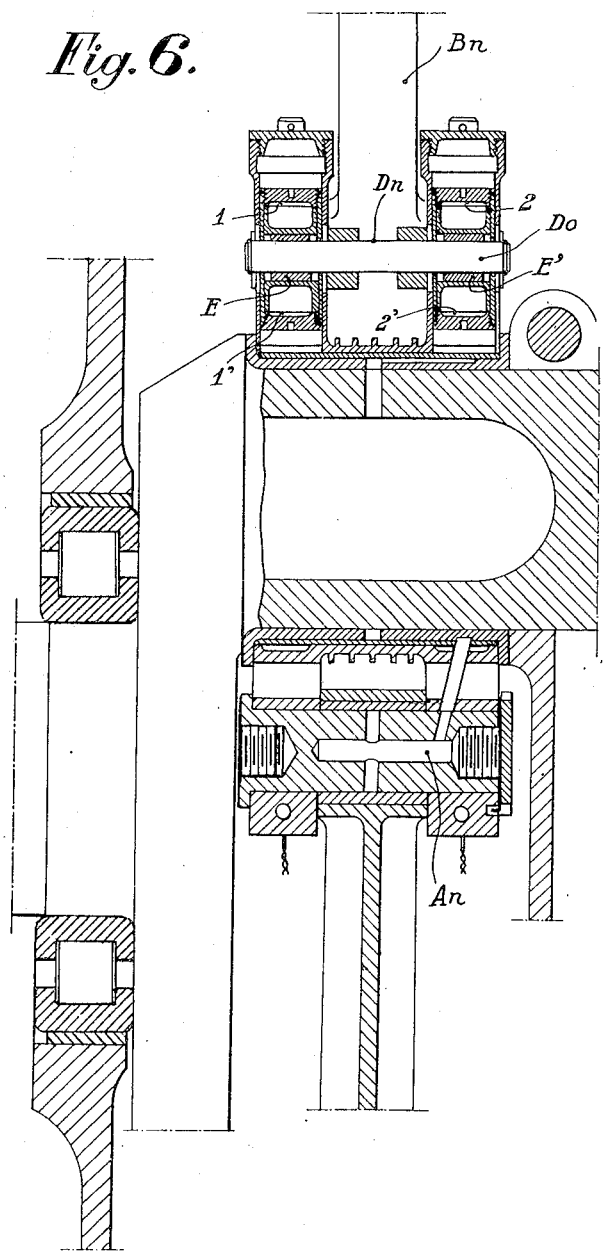

In the arrangement according to the invention at least two series of plungers or pistons engaged in at least two fluid-tight cylinders provided in the connecting ring and filled with an incompressible liquid, the movement of the pistons being controlled by the rods (one in each series per rod) and in such manner that the pistons shall be moved in (or out) by an amount proportional to the sine of the angle intersected between the rod and the radius of the ring through the big end pin of the rod. In a symmetric rotary engine whose connecting ring is displaced in parallel motion during the rotation of the crankshaft, the sum of the sines of these angles is constant. Consequently, a communication established between the two cylinders whose total capacity remains constant during the movement of the rods will enable the ring to be freely rotatable on the crank pin until it is in a desired position with respect to the cylinders at which time communication between the cylinders may be cut off and the ring will be set in the desired position to retain the desired set thereafter during the rotation of the crankshaft. Figures 5 and 6 of the drawings disclose the details of the device. In order that the actions may remain symmetric with respect to the plane of symmetry common to all the cylinders, twice the strictly necessary number of elements including pistons and cylinders are used. Each rod or link $B_n$ is provided with an offset pin $D_n$ parallel with the big end pin $A_n$. In the movement of the rod $B_n$ about its pin $A_n$, the pin $D_n$ imparts a movement to the pistons $1$, $1'$ and $2$, $2'$ through the medium of the plane faces of the parts E and E' at right angles to the axes of the cylinders in which the pistons are slidably received. If the position $A_nD_o$ corresponding to $A_nD_n$ perpendicular to the straight line followed by $D_n$ be taken as the origin of the positions of $A_nD_n$, it will be appreciated that the pistons in their movement will alter the capacities of the cylinders proportionally to the sines of such angles as $D_oA_nD_n$. Communication between the cylinders provided in the ring member can be established by opening the valve $V_1$ located in the communication passage F. When the valve $V_1$ is open it is then possible to completely fill the chambers with an incompressible liquid through one of the plugs such as $G_n$ and replacing it thereafter.

In order to set the connecting ring in a desired position it is only necessary to close the valve $V_1$ to remove from the ring the last degree of freedom that was left to it and to keep it in a set position with respect to the engine crank case during the rotation of the crankshaft and its resulting movement will thus be a movement of translation.

The arrangements described above in connection with an internal combustion engine are directly transposable to other reciprocatory engines, piston pumps or like machines using eccentric motion devices.

I claim:

The connecting rod assembly for radial cylinder devices of devices of the type including a crankcase having a plurality of radially disposed cylinders and pistons, a crankshaft rotatably mounted in said crankcase and having a crank pin, a connecting ring rotatably mounted on said crank pin, a plurality of fulcrum pins equal in number to the number of said cylinders and carried by said ring at points thereof symmetrically distributed about its center, a plurality of rods connecting respective ones of said pins to respective ones of said pistons, and means associated with said connecting ring for adjustably setting and preventing rotation of the ring on the crank pin to adjustably determine the set position of the ring during its circular displacement around the crankshaft as the crankshaft is rotated, said last named means to adjustably determine the set position of said connecting ring comprising a plurality of closed cylinders carried by said ring and at least equal in number to the number of radially disposed cylinders, each of said closed cylinders having a piston member therein, fluid passageways interconnecting the top ends of said closed cylinders, fluid passageways interconnecting the bottom ends of said closed cylinders, an incompressible liquid filling the whole of said cylinders and said fluid passageways in both the volumes at the top of the closed cylinders and at the bottom of the closed cylinders, each of said rods being provided with an offset wrist pin directed laterally in the plane of said connecting ring and linked to respective ones of said piston members, and means to modify the volume of liquid in the top of the closed cylinders with respect to the liquid volume in the bottom of said closed cylinders and thus adjust the set position of said connecting ring on said crank pin.

ROBERT MERCIER.

REFERENCES CITED

The following references are of record in the file of this patent:

UNITED STATES PATENTS

| Number | Name | Date |
|---|---|---|
| 2,185,902 | Schubert | Jan. 2, 1940 |
| 2,233,669 | Lawrence | Mar. 4, 1941 |
| 2,317,154 | Taber | Apr. 20, 1943 |
| 2,378,507 | Sharpe | June 19, 1945 |
| 2,390,623 | Steiner | Dec. 11, 1945 |